No. 640,747. Patented Jan. 9, 1900.
O. F. CONKLIN.
ELECTRIC MOTOR.
(Application filed Apr. 24, 1899.)

(No Model.)

Witnesses
Harry G. Wiseman
Earl J. Welch

Inventor
Oliver F. Conklin
By his Attorney

UNITED STATES PATENT OFFICE.

OLIVER F. CONKLIN, OF SPRINGFIELD, OHIO.

ELECTRIC MOTOR.

SPECIFICATION forming part of Letters Patent No. 640,747, dated January 9, 1900.

Application filed April 24, 1899. Serial No. 714,158. (No model.)

*To all whom it may concern:*

Be it known that I, OLIVER F. CONKLIN, a citizen of the United States, residing at Springfield, in the county of Clark and State of Ohio, have invented certain new and useful Improvements in Electric Motors, of which the following is a specification.

My invention relates to improvements in electric motors, and especially relates to the field-magnets and constructions therefor.

Figure 1:
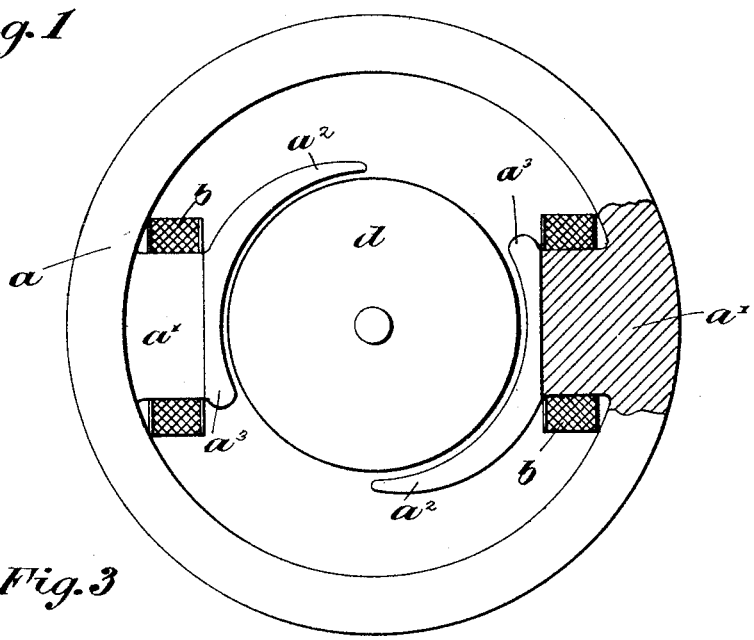
Figure 3:
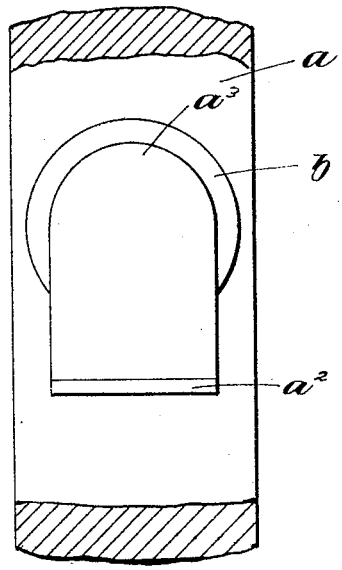
Figure 2:
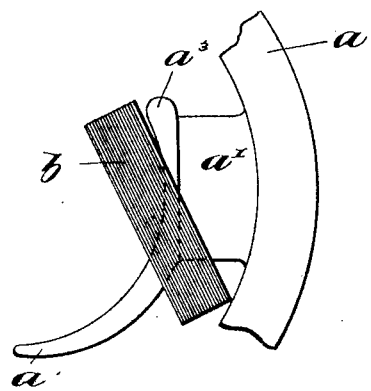

In the accompanying drawings, Figure 1 is a plan view showing a device embodying my invention. Fig. 2 is a detail of the same, illustrating the manner of placing the coil in position on the magnet-core. Fig. 3 is an elevation showing the magnet complete.

Like parts are represented by similar letters of reference in the several views.

In constructing my improved motor I employ a circuit-ring $a$, of metal, with which there are formed integrally the metallic cores $a'$. Each of these cores is formed with a long pole-piece $a^2$ and a short pole-piece $a^3$. The coil $b$, which surrounds the core $a'$, is seated in the usual way upon the core; but by reason of the peculiar shape of the pole-pieces $a^2$ and $a^3$ I am enabled to wind this coil separate from the core and to hook the same over the core and pole-pieces, as shown in Fig. 2, after the coil is complete. By the construction thus shown it will be seen that I obtain a motor in which the magnetic circuit is maintained at the highest efficiency, all of the parts being integral. I am thus enabled to reduce the cores to the minimum, while by reason of the extended pole-pieces $a^2$ I secure the proper electromagnetic field for the armature and at the same time by having the long and short pole-pieces, as described, the field may be easily and simply constructed by winding the coil first and crowding it over the short pole-piece after the same has been hooked on the long pole-piece, as shown in Fig. 2.

Having thus described my invention, I claim—

In an electric motor, a metallic supporting-ring integrally formed with T-shaped heads, said heads being formed with one long and one short pole and separately-formed coils adapted to be hooked over the long pole and pressed into position over the short pole, whereby the said coils are held in place on the said pole-pieces wholly by the projecting poles extending in opposite directions, substantially as specified.

In testimony whereof I have hereunto set my hand this 19th day of April, A. D. 1899.

OLIVER F. CONKLIN.

Witnesses:
CHAS. I. WELCH,
EARL G. WELCH.